US011766066B2

(12) United States Patent
Desmarais et al.

(10) Patent No.: US 11,766,066 B2
(45) Date of Patent: Sep. 26, 2023

(54) SYSTEMS AND METHODS FOR MEDICINAL CANNABIS HARVESTING

(71) Applicants: Kerry T Desmarais, Sunnyside, WA (US); Thomas Carpenter, Jr., Granger, WA (US); Craig A Carpenter, Granger, WA (US); Matthew Ryan Beechinor, Ketchum, ID (US); Thomas Frazer, Ketchum, ID (US); Bill Belcourt, Salt Lake City, UT (US); Evan Bouchier, Issaquah, WA (US)

(72) Inventors: Kerry T Desmarais, Sunnyside, WA (US); Thomas Carpenter, Jr., Granger, WA (US); Craig A Carpenter, Granger, WA (US); Matthew Ryan Beechinor, Ketchum, ID (US); Thomas Frazer, Ketchum, ID (US); Bill Belcourt, Salt Lake City, UT (US); Evan Bouchier, Issaquah, WA (US)

(73) Assignee: FRAZER INDUSTRIES LLC, Ketchum, ID (US)

( * ) Notice: Subject to any disclaimer, the term of this patent is extended or adjusted under 35 U.S.C. 154(b) by 1068 days.

(21) Appl. No.: 15/261,894

(22) Filed: Sep. 10, 2016

(65) Prior Publication Data

US 2016/0374386 A1 Dec. 29, 2016

Related U.S. Application Data

(63) Continuation-in-part of application No. 13/012,443, filed on Jan. 24, 2011, now Pat. No. 9,961,834, and a
(Continued)

(51) Int. Cl.
*A01D 46/02* (2006.01)
*A24B 5/06* (2006.01)

(52) U.S. Cl.
CPC ............... *A24B 5/06* (2013.01); *A01D 46/02* (2013.01)

(58) Field of Classification Search
None
See application file for complete search history.

(56) References Cited

U.S. PATENT DOCUMENTS 1,128,005 A * 2/1915 Kimble et al. .......... H02P 7/063
388/816
1,518,349 A * 12/1924 Olson ...................... A24B 5/02
460/137
(Continued)

*Primary Examiner* — Michael J Felton
(74) *Attorney, Agent, or Firm* — Trent Baker; Baker IP PLLC

(57) ABSTRACT

One embodiment of the present invention relates to a system for cannabis stem harvesting configured to specifically separate the leaves and buds from the stem. The system includes a frame member, die member, first rotating cylindrical member, second rotating cylindrical member, and a rotation system. The die member is coupled to the frame member and includes a plurality of orifices disposed within a plate. The first and second rotating cylindrical members are coupled to the frame member in a vertical configuration and oriented substantially adjacent to the die member. The vertical configuration of the first and second rotating cylindrical members defines a pinch region therebetween as a region across which a first and second circumferential surface of the first and second rotating cylindrical members are closest in proximity. The rotation system is coupled to the frame member and at least one of the first and second rotating members.

19 Claims, 15 Drawing Sheets

Related U.S. Application Data continuation-in-part of application No. 12/319,984, filed on Jan. 13, 2009, now abandoned.

(56) References Cited

U.S. PATENT DOCUMENTS

| | | | | |
|---|---|---|---|---|
| 3,437,152 A | * | 4/1969 | Barrentine | A01B 39/085 |
| | | | | 171/58 |
| 5,331,980 A | * | 7/1994 | Bailey | A01D 45/16 |
| | | | | 131/290 |

* cited by examiner

SYSTEMS AND METHODS FOR MEDICINAL CANNABIS HARVESTING

RELATED APPLICATIONS

This is a continuation-in-part of application Ser. No. 13/012,443 filed on Jan. 24, 2011 which is a continuation-in-part of application Ser. No. 12/319,984 filed on Jan. 13, 2009. Priority is hereby claimed to all material disclosed in the original '984 application and the co-pending '443 application.

FIELD OF THE INVENTION

The invention generally relates to systems and methods for medicinal and recreational cannabis harvesting. In particular, the present invention relates to systems and methods for separating medicinal and recreational cannabis stems from leaves and buds.

BACKGROUND OF THE INVENTION

Cannabis plants are now commonly grown to facilitate the increasing demand for medicinal and recreational cannabis products. The legalization of cannabis has increased the demand for higher quality cannabis products at regulated prices. Therefore, farmers and growers are seeking solutions to increase harvest efficiency while maintaining quality. The growing and harvesting of cannabis plants is a multi-step process that was traditionally performed entirely by hand.

Cannabis plants grow in a bush-like configuration, including a plurality of intertwined stems with leaves and buds. The stems of the plant contain less than desirable amounts of the cannabis components. Therefore, one of the primary steps in harvesting cannabis plants is separating the desirable leaves and buds from the undesirable stems. Conventional manual processes for the separating step include holding the stem with one hand while simultaneously pulling off the leaves and buds with the opposite hand or cutting the buds from the stem with scissors. There are many challenges in removing the leaves and buds from the stems. For example, Cannabis stems may include a wide variety of diameters depending on the size of the plant and proximity to the roots. Likewise, different types or strains of Cannabis may include different strengths such as stem deformation, leaf bonding, bud bonding, etc.

Various automated stem-leaf separation processes have been attempted for cannabis separation. These processes include attempts at repurposing harvesting equipment from other crops to use with cannabis. Unfortunately, these attempts at automated cannabis stem-leaf separation processes have failed to accurately and/or efficiently strip the leaves and buds from the vine without significant loss, yield inefficiencies, location constraints, and/or danger to operators. Cannabis plants are very different from other plants, and conventional harvesting equipment cannot successfully be repurposed without significant modification.

Therefore, there is a need in the industry for an improved method and apparatus of cannabis stem separation from leaves and buds.

SUMMARY OF THE INVENTION

The present invention relates to systems and methods for separating cannabis stems from leaves and buds. One embodiment of the present invention relates to a system for cannabis stem harvesting configured to specifically separate the leaves and buds from the stem. The system includes a frame member, a die member, first rotating cylindrical member, second rotating cylindrical member, and a rotation system. The die member is coupled to the frame member and includes a plurality of orifices disposed within a single layer plate. The first and second rotating cylindrical members are coupled to the frame member in a vertical configuration and oriented substantially adjacent to the die member. The vertical configuration of the first and second rotating cylindrical members defines a pinch region therebetween as a region across which a first and second circumferential surface of the first and second rotating cylindrical members are closest in proximity. The rotation system is coupled to the frame member and at least one of the first and second rotating members. A second embodiment of the present invention relates to a method of separating the stem from the leaves and buds of a cannabis plant, including the acts of aligning the plant with an orifice, inserting the stem of the plant into the orifice, pulling the plant through the orifice, and stripping the leaves and buds from the stem.

Embodiments of the present invention represent a significant advance in the field of cannabis stem harvesting. Conventional manual cannabis harvesting techniques are extremely inefficient and inconsistent. Conventional automatic vine harvesting systems from other fields are ineffective for cannabis because of the unique stem structure of the plant versus the stalk structure of other plants such as tobacco. Embodiments of the present invention provide multiple orifices or channels through which a user can insert the cannabis stem which includes the desirable leaves and buds. The stems of the cannabis plant may have different thicknesses depending on various factors and therefore a single orifice stripper will not properly harvest cannabis leaves and buds.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

Figure 1:
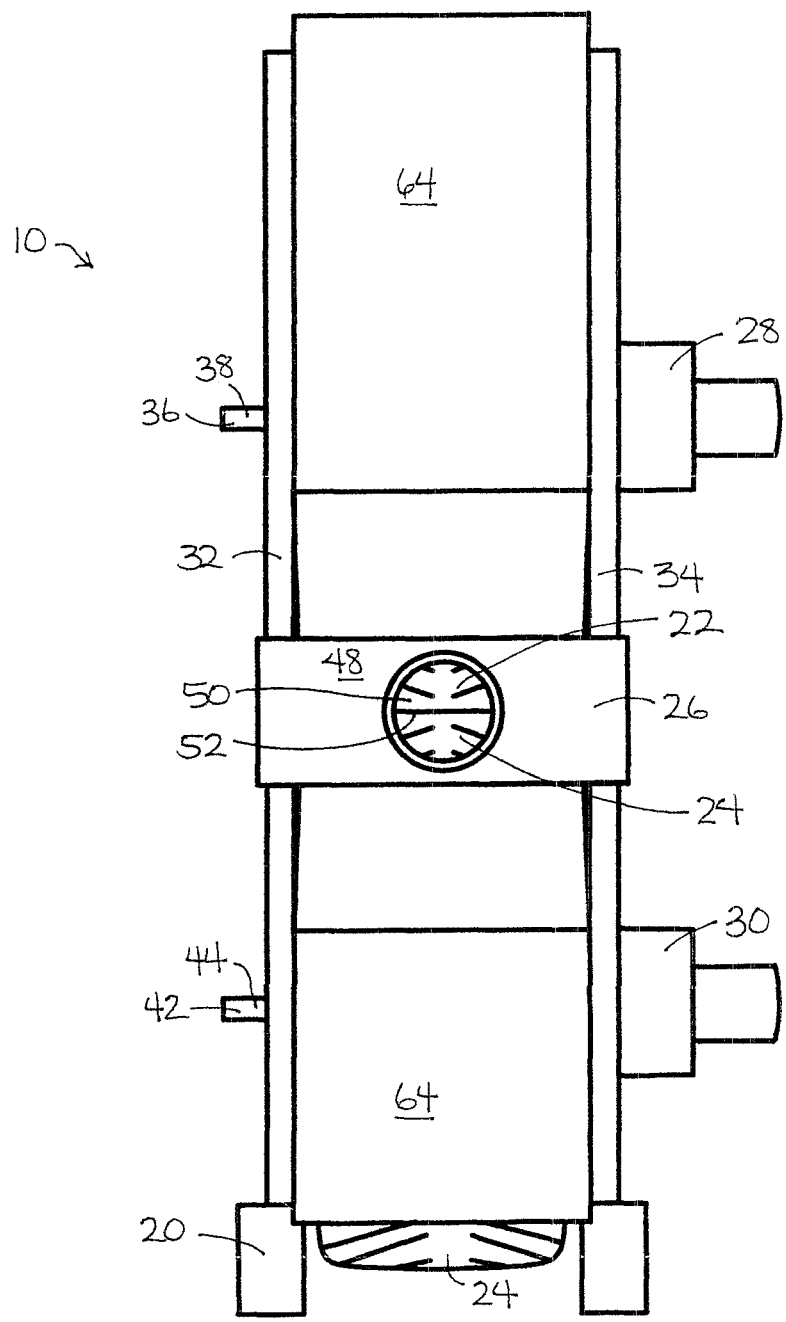
FIG. 1 is a front elevation view of the vine stripping apparatus of the present invention.

The present invention relates to systems and methods for separating cannabis stems from leaves and buds. One embodiment of the present invention relates to a system for cannabis stem harvesting configured to specifically separate the leaves and buds from the stem. The system includes a frame member, a die member, first rotating cylindrical member, second rotating cylindrical member, and a rotation system. The die member is coupled to the frame member and includes a plurality of orifices disposed within a single layer plate. The first and second rotating cylindrical members are coupled to the frame member in a vertical configuration and oriented substantially adjacent to the die member. The vertical configuration of the first and second rotating cylindrical members defines a pinch region therebetween as a region across which a first and second circumferential surface of the first and second rotating cylindrical members are closest in proximity. The rotation system is coupled to the frame member and at least one of the first and second rotating members. A second embodiment of the present invention relates to a method of separating the stem from the leaves and buds of a cannabis plant, including the acts of aligning the plant with an orifice, inserting the stem of the plant into the orifice, pulling the plant through the orifice, and stripping the leaves and buds from the stem. Also, while embodiments are described in reference to a system and method for cannabis stem harvesting, it will be appreciated that the teachings of the present invention are applicable to other areas of cannabis harvesting.

The following terms are defined as follows:

DEFINITIONS

Cannabis—a particular plant family including various strains or varieties intended for both medicinal and recreational purposes. All cannabis plants grow in a bush-like format with intertwining stems of varying diameters. Each stem may contain various numbers of leaves and/or buds. For medicinal and recreational purposes, the leaves and buds contain desirable ingredients, whereas the stems are undesirable for most applications.

Rotating cylindrical member—a member that has a cylindrical shape including a curved circumferential surface between two ends. The member is also configured to rotate about an axis which extends between the two ends. Therefore, two dimensional linear regions of the circumferential surface between the ends rotate in a radial manner around an axis which extends through the ends.

Durometer—a measurement of material hardness wherein a lower durometer relates to a lower degree of hardness and a higher durometer relates to a higher degree of hardness. For example, steel has a high durometer while foam has a low durometer.

Die member—a single layer plate which may contain a plurality of holes, dies, or orifices.

Pinch region—a two dimensional region between two substantially adjacent cylindrical rotating members. The pinch region is the linear region across which the two cylindrical rotating members are in closest proximity. The pinch region may also be defined as a location between two radial positions of the two circumferential surfaces at which the circumferential surfaces are in closest proximity.

Figure 2:
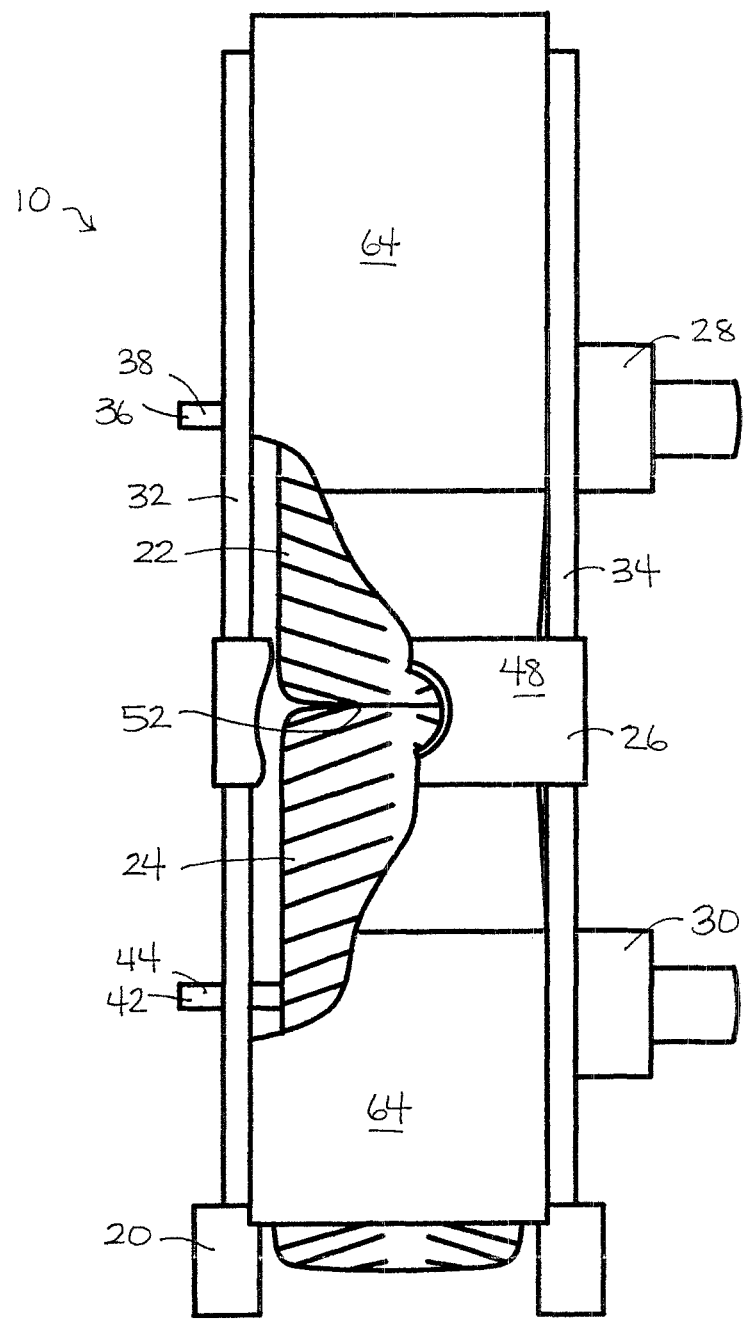
FIG. 2 is a front elevation view of the vine stripping apparatus of the present invention, shown in cut-away view.

With reference to FIGS. 1 and 2, the vine stripping apparatus 10 comprises a support frame 20, two counter-rotating wheels 22 and 24, a vine stripper 26, and wheel rotating means 28 and 30.

The support frame 20 comprises a structure for supporting the counter-rotating wheels 22, 24. A preferred embodiment of the support frame is shown in FIGS. 1 through 3, 9 and 10. In this embodiment, the support frame consists of a first support rail 32 and a second support rail 34, wherein the first and second support rails are substantially parallel to one another. In the embodiment shown in the drawings, the support frame is substantially vertically oriented. However, it is contemplated that the support frame may be positioned in any orientation that is convenient for the particular application. It is further contemplated that the support frame may be configured in any number of ways, so long as the support frame is adapted to receive the counter-rotating wheels in the relative position as described herein.

A pair of counter-rotating wheels are mounted on the support frame 20. In the preferred embodiment shown in the drawings, the counter-rotating wheels include a first wheel 22 having a first lateral surface 22a, and a second wheel 24 having a second lateral surface 24a. In a preferred embodiment, the counter-rotating wheels comprise pneumatic (inflatable) tires, such as conventional automotive tires, mounted on conventional automotive wheels. Conventional automotive tires and wheels, as shown in the drawings, are especially suitable for carrying out the invention because the pressure in the tires can be adjusted to an optimum level. However, any wheel having a pliable lateral surface could be used in place of the automotive tire and wheel as described and shown herein, and is considered to be within the scope of the invention. According to the invention, at least one of the wheels has a pliable lateral surface.

Figure 3:
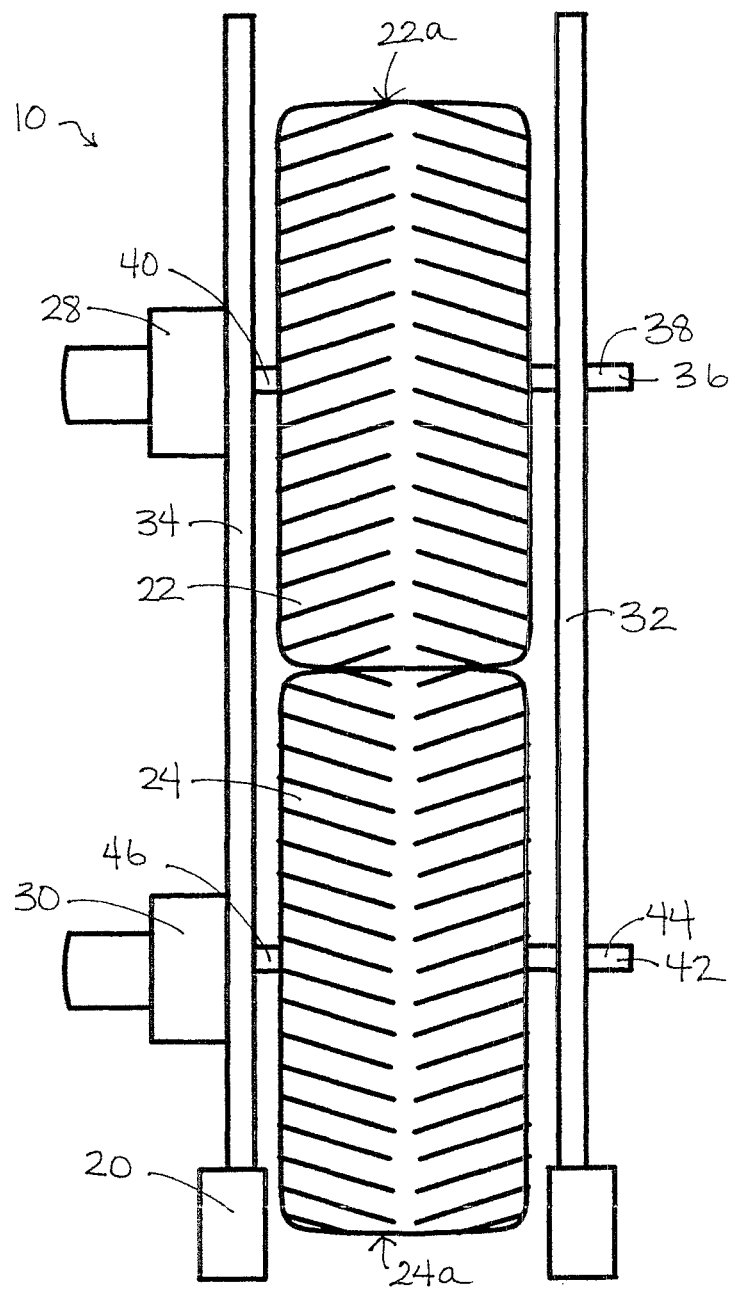
FIG. 3 is a rear elevation view of the vine stripping apparatus of the present invention.
Figure 4:
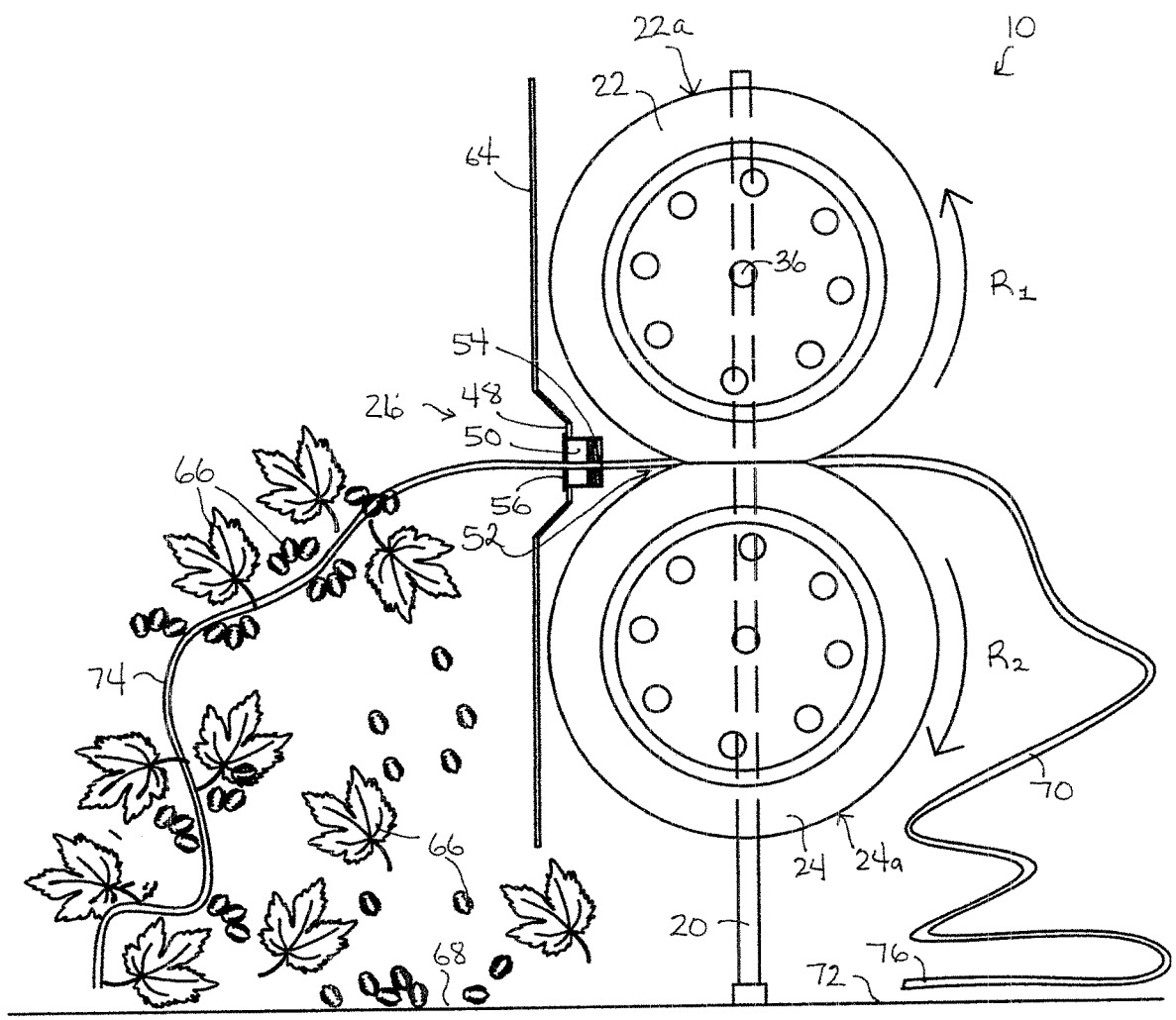
FIG. 4 is a side section view of the vine stripping apparatus of the present invention.
Figure 5:
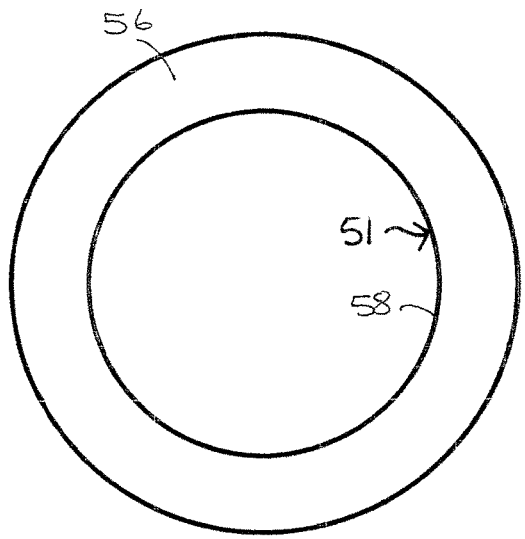
FIG. 5 is a plan view of a first embodiment of a threaded stripping die of the present invention.
Figure 6:
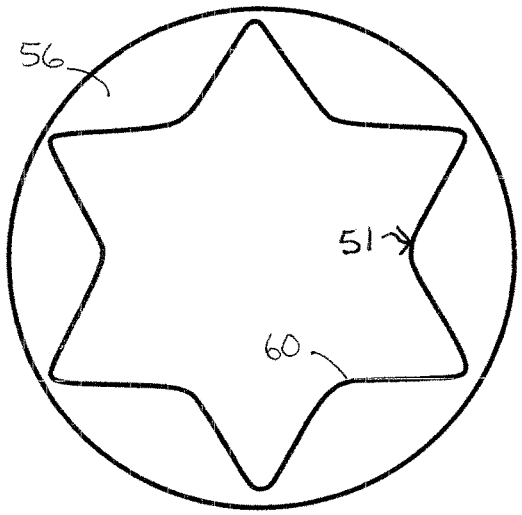
FIG. 6 is a plan view of a second embodiment of a threaded stripping die of the present invention.
Figure 7:
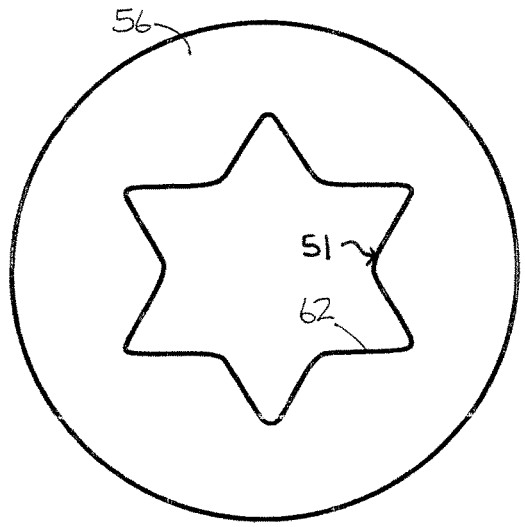
FIG. 7 is a plan view of a third embodiment of a threaded stripping die of the present invention.

The first wheel 22 and the second wheel 24 are rotatably secured to the support frame 20 on a first axle 36 and a second axle 42, respectively. The first axle has a first end 38 and a second end 40. The second axle has a first end 44 and a second end 46. Each axle first end is rotatably secured to the first support rail 32 of the support frame. Each axle second end is functionally engaged with the wheel rotating means 28, 30 mounted on the second rail 34 of the support frame. The first axle and the second axle are parallel to and spaced apart from one another, such that the lateral surfaces 22a, 24a of the counter-rotating wheels are compressed against one another in substantially full contact with one another, as shown in FIGS. 2, 3 and 4. It has been found by the inventors that the compression of the counter-rotating wheels against one another is critical to the function of the vine stripping apparatus. As will be described more fully below, the counter-rotating wheels grip the vine to be stripped, and provide pulling force to draw the vine through the vine stripper 26 as the wheels are rotated at relatively high speed. The grip on the vine must be secure and not disposed to slipping or crushing the vine. Pneumatic tires are uniquely suited to this purpose because the pressure in the tires, and thus the gripping force, is adjustable by simply increasing or decreasing the pressure in the tires. At the appropriate tire pressure, the surface of the pneumatic tires will conform to accommodate the shape of the vine while gripping it securely as pulling force is applied and plant material is stripped away by the vine stripper. Pneumatic tires inflated to about 30 to 45 psi have been found to be most effective in carrying out the invention.

In a preferred embodiment, the vine stripper 26 is affixed to the support frame 20, although this is not a requirement of the invention. A freestanding or alternative support for the vine stripper may also be employed. The vine stripper comprises at least one stripping orifice 50. The stripping orifice receives an end of the vine to be stripped, and is the point at which the plant material is removed from the vine during the operation of the vine stripping apparatus. In a preferred embodiment, the stripping orifice is formed in a stripping orifice plate 48. The stripping orifice has a blunt, substantially planar stripping edge 51. The inventors have found that the blunt edge allows the plant material to be removed from the vine without inadvertently severing the vine. In operation, vines are pulled very quickly through the stripping orifice by the counter-rotating wheels, and in the process tend to wave and move about. The vines are bulky, rope-like, and somewhat unwieldy. A sharp stripping edge would certainly sever the vine, and would therefore be unworkable for the present invention.

Figure 8:
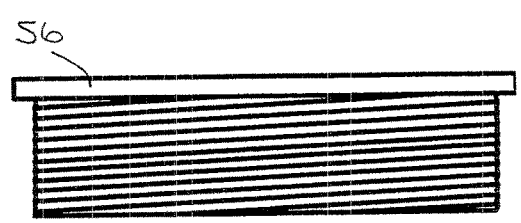
FIG. 8 is a side view of a threaded stripping die of the present invention.

FIGS. 4 and 8 show a side view of the stripping orifice 50; in these figures it can be seen that the stripping edge 51 is substantially planar and does not protrude outwardly from the stripping orifice. This feature adds both functionality and safety to the invention design. The substantially flush stripping edge eliminates another potential cause of vine breakage when the vine stripping apparatus is in use. A protruding point or notch in the stripping orifice is more likely to catch the vine and cause it to be severed by the stripping orifice. The flush stripping orifice is also a significant safety feature of the present invention. In use, the vine stripping apparatus may be mounted on a mobile harvesting unit. An operator rides on the mobile harvesting unit and feeds vines into the vine stripping apparatus while the unit is in motion. A protruding blade or teeth on the stripping orifice would surely lead to operator injury. The stripping orifice is large enough to allow a vine and support twine to pass through, but small enough to prevent the passage of the majority of leaves and other plant material, such as hops. The stripping orifice is also sized to prevent the operator's hand from inadvertently being pulled through.

As shown in FIGS. 1, 2 and 4, the stripping orifice 50 is positioned between the first axle 36 and the second axle 44, centered proximate a contact point 52 where the first lateral surface 22a of first wheel 22 and the second lateral surface 24a of second wheel 24 contact one another. Preferably, the stripping orifice is located in close proximity to the contact point 52, as best seen in FIG. 4. In an embodiment in which the wheels are approximately 24 inches in diameter and approximately 8½ inches in width, placement of the stripping orifice approximately 6 inches from the contact point is ideal. The inventors have found that the placement of the stripping orifice near the contact point minimizes the likelihood that the vine will break during the stripping operation, and allows the vine stripping apparatus to be operated at higher speeds.

Preferably, the stripping orifice 50 comprises a threaded opening 54 in the stripping orifice plate 48, and a complementary threaded stripping die 56 having a substantially cylindrical body receivable in the threaded opening. In this embodiment, several interchangeable stripping dies, such as the ones shown in FIGS. 5, 6 and 7 and 8, can be employed. In an additional preferred embodiment (not shown), the stripping orifice comprises an opening in the stripping orifice plate 48 and a channel affixed on the stripping orifice plate for slidably receiving a stripping die having a substantially planar rectangular body.

The size and configuration of the stripping orifice can be matched to the particular species or variety of plant being harvested. It has been found that certain shapes are more effective at catching and removing plant material from a vine as it pulled through the stripping orifice 50. The circular opening 58 of the threaded stripping die shown in FIG. 5, and the "star" shaped openings 60 and 62 of the threaded stripping dies shown in FIGS. 6 and 7 have been used with success with hop vines. In particular, the star shape has been found to be especially effective in removing plant material, due to the multiple "notches" created by the points of the star.

The purpose of the counter-rotating wheels, first wheel 22 and second wheel 24, is to grasp and pull the vine and twine through the stripping orifice 50. In order to accomplish this pulling action, the first wheel 22 is rotated in a first direction $R_1$, and the second wheel 24 is rotated in a second direction $R_2$, opposite the first direction. The counter-rotation of the wheels is best shown in FIG. 4, wherein it can be seen that the first wheel is rotated in a counterclockwise direction, and the second wheel is rotated in a clockwise direction. The result of the counter-rotational relationship of the wheels is that at the contact point 52, both wheels are rotating in a direction away from the stripping orifice 50.

The rotating means 28 and 30 shown in FIGS. 1 through 4 provide power to effect the rotation of the wheels 22, 24 as described above. In a preferred embodiment, the rotating means are hydraulic motors, although other types of power sources are contemplated, including electric power, combustible fuel, and manual power.

In a preferred embodiment shown in FIGS. 1 and 2, the vine stripping apparatus 10 further includes a cowling 64, which provides a safety barrier to protect the operator from the rotating wheels 22, 24.

In use, the vine stripping apparatus 10 rapidly and thoroughly removes substantially all plant material 66 from a vine and deposits it in a collection location 68, and ejects the stripped vine 70 in a disposal location 72. See FIGS. 4 and 9. The process of stripping a vine using the vine stripping apparatus described herein includes first obtaining an unstripped vine 74 that has been severed from its root. As referred to herein, an "unstripped vine" is a vine that has not been stripped of leaves and other plant material, and may or may not include the support twine on which the vine was grown. In the case of hop vines, both the root end and trellis end of the vine and twine must be severed, leaving a completely detached unstripped vine. The wheel rotating means 28, 30 are engaged to turn first wheel 22 in direction $R_1$ and second wheel 24 in direction $R_2$. The root end 76 of the unstripped vine is inserted into the stripping orifice 50 until it reaches the wheel contact point 52. As the wheels turn, the root end of the unstripped vine is grasped between the wheels and the vine is pulled through the stripping orifice. Plant material 66 growing on the vine is too bulky to pass through the stripping orifice, and is therefore pulled off of the vine by the stripping orifice and deposited in the collection location 68. As the unstripped vine is continuously advanced, it is stripped clean and the stripped vine 70 is deposited in the disposal location 72. The stripping process occurs rapidly—under ideal conditions, approximately thirty 18-foot vines can be stripped per minute.

An advantage of the process described herein is that nearly all of the plant material 66 is removed from the vine, resulting in very little waste. An additional advantage of the process is that the plant material sustains very little damage during this stripping process. This is due to the "self-cushioning" effect that results as the vine passes through the stripping orifice 50. The plant material tends to accumulate against the stripping orifice, forming a cushion against which additional plant material is pressed as the vine is pulled through.

Figure 9:
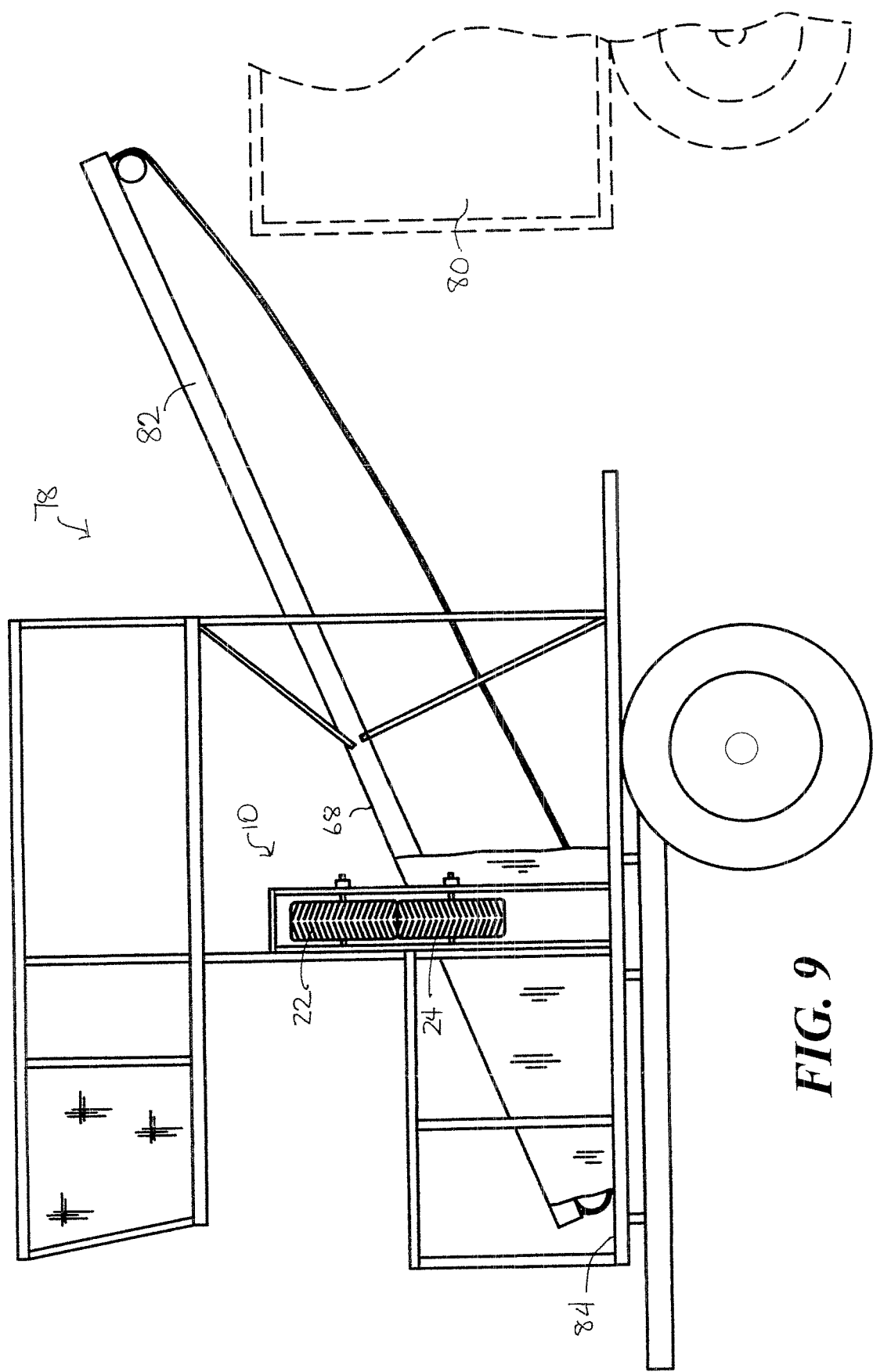
FIG. 9 is a side elevation view of an embodiment of the vine stripping apparatus, shown mounted on a mobile harvesting unit suitable for use in a hop field.
Figure 10:
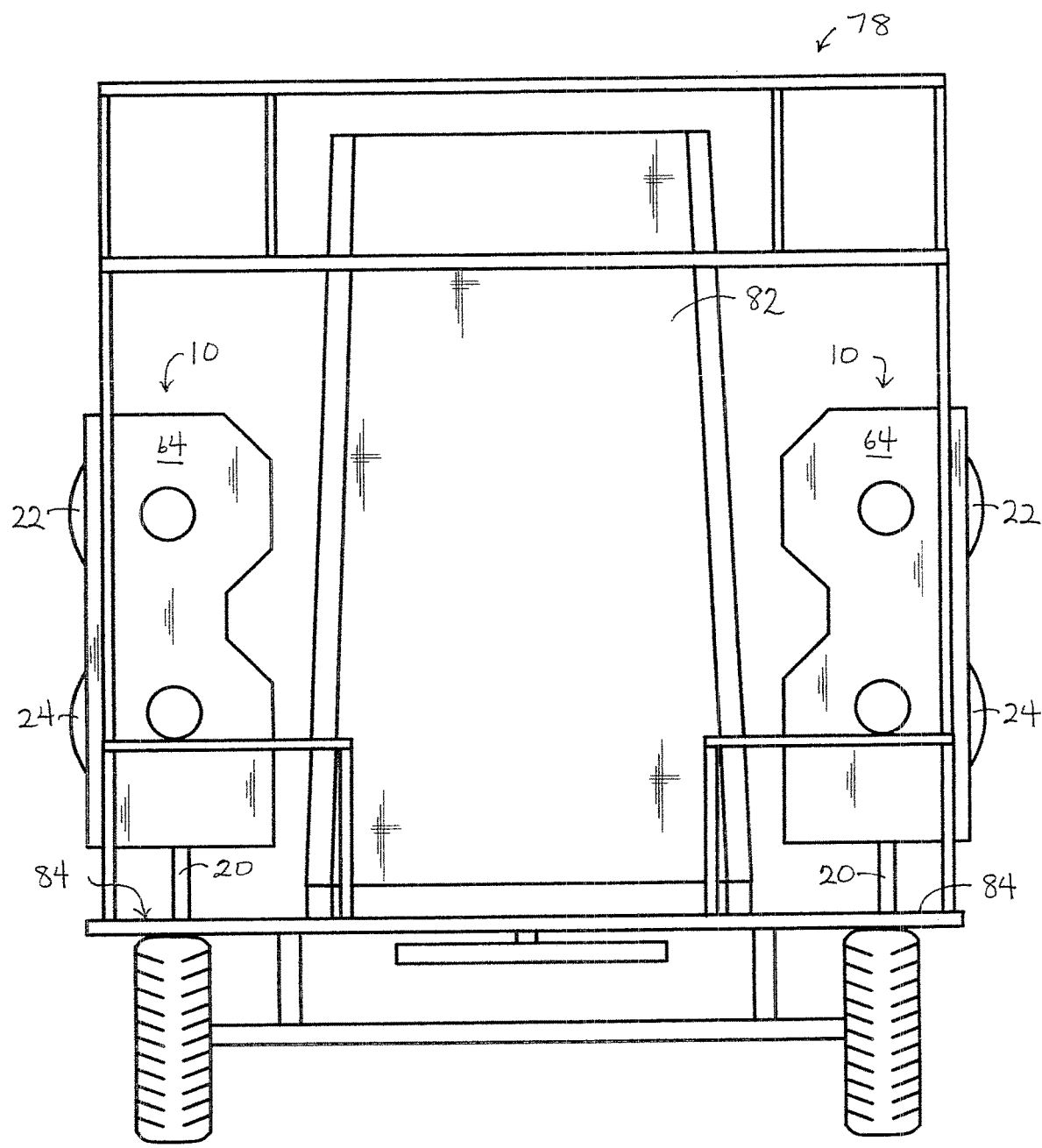
FIG. 10 is a rear elevation view of an embodiment of the vine stripping apparatus, shown mounted on a mobile harvesting unit suitable for use in a hop field.

In an embodiment of the invention, at least one vine stripping apparatus 10 is mounted to a mobile harvesting unit 78 suitable for use in the field where the crop to be harvested is grown. The mobile harvesting unit is used in combination with a receptacle 80 for collecting the harvested plant material 66 and transporting it to a central processing facility for further sorting and processing. The mobile harvesting unit may be adapted to be towed by another powered vehicle, as shown in FIGS. 9 and 10, or it may include an integrated power source for moving through the field. In addition, the mobile harvesting unit or the powered vehicle may include a power source for providing power to the rotating means 28, 30 of the vine stripping apparatus.

The mobile harvesting unit 78 is adapted to receive one or more vine stripping apparatuses, as shown generally in FIGS. 9 and 10. A conveyor 82 is provided in the bed of the vehicle for receiving the plant material 66 and carrying it to be deposited in the receptacle 80. Each vine stripping apparatus 10 is positioned on the vehicle so that the vine stripper 26 is substantially oriented toward the conveyor. An operator platform 84 in the vehicle provides a secure location for the operator to stand as he or she feeds unstripped vines 74 into the vine stripping apparatus 10.

Figure 11:
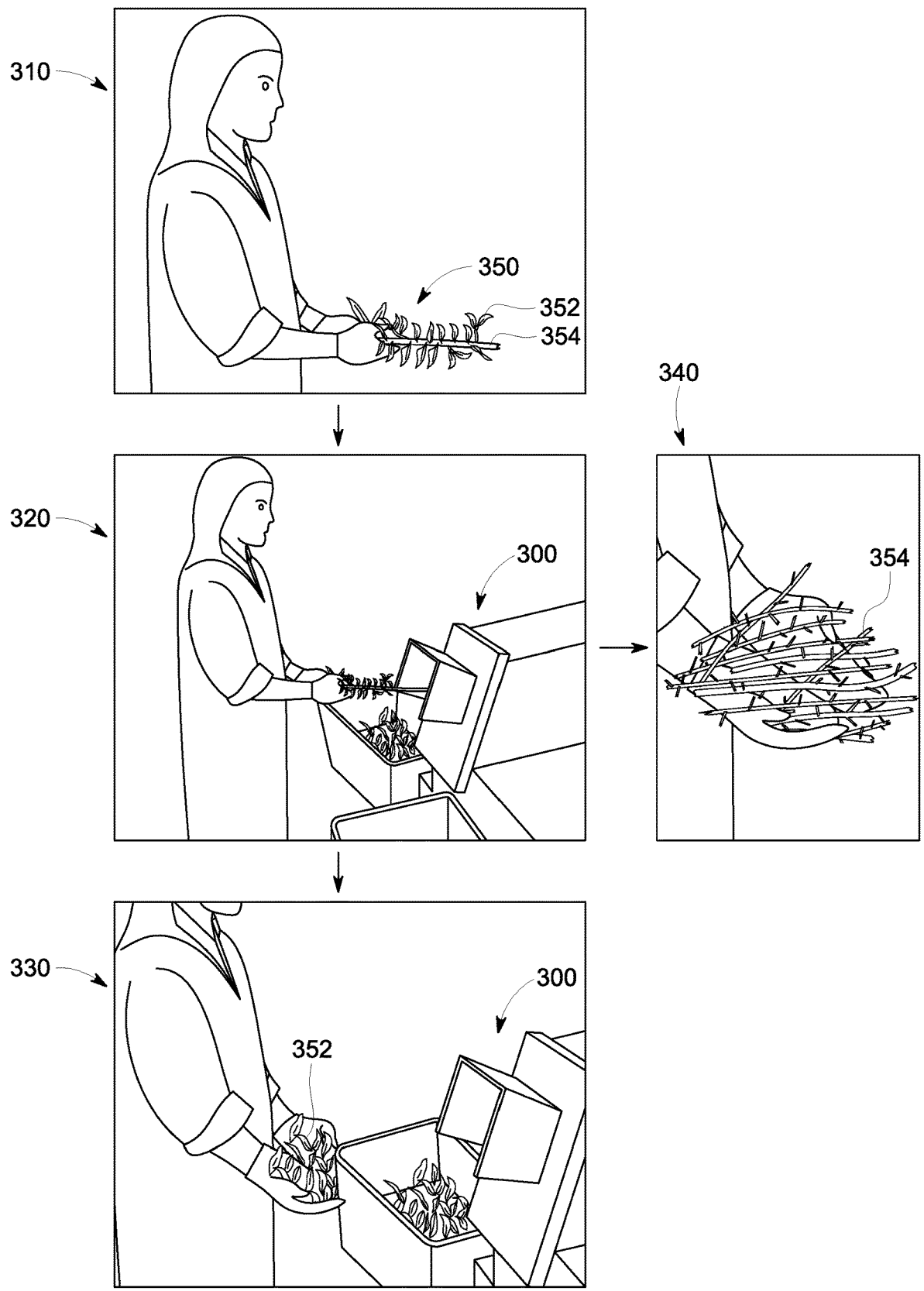
FIG. 11 is process view illustrating a method for separating a cannabis plant stem from cannabis leaves and buds in accordance with embodiments of the present invention.

Reference is next made to FIG. 11, which illustrates a general process of separating a cannabis plant stem from cannabis leaves and buds using a system designated generally at 300. The system 300 will be described in more detail with reference to FIGS. 12-14. The illustrated process begins with the act of providing a cannabis plant 350 including both a stem 354 and a plurality of leaves and buds 352, designated generally at 310. It will be appreciated that the cannabis plant 350 may be any type of cannabis including various varieties, strains, growing techniques, stages of harvest, etc. Likewise, the cannabis plant 350 may be either in a wet or dry state depending on whether a pre-harvesting drying act was performed prior to stem harvesting. A user then selects and orients the stem 354 with an orifice or die on a harvesting system 300, designated generally at 320. The act of selecting the orifice to correspond to the stem 354 includes selecting an orifice with a diameter that substantially corresponds to the diameter of the stem 354. The more closely the diameter of the orifice corresponds to the stem diameter, the more efficient the operation of the stem harvesting process and system. The system 300 separates the stems 354 from the leaves and buds 352 as represented by the independent acts 340 and 330. The illustrated implementation shows the leaves and buds 352 being directed into a bin directly below the orifices while the stems are routed to a second depository (not shown) behind the orifices.

Figure 12A:
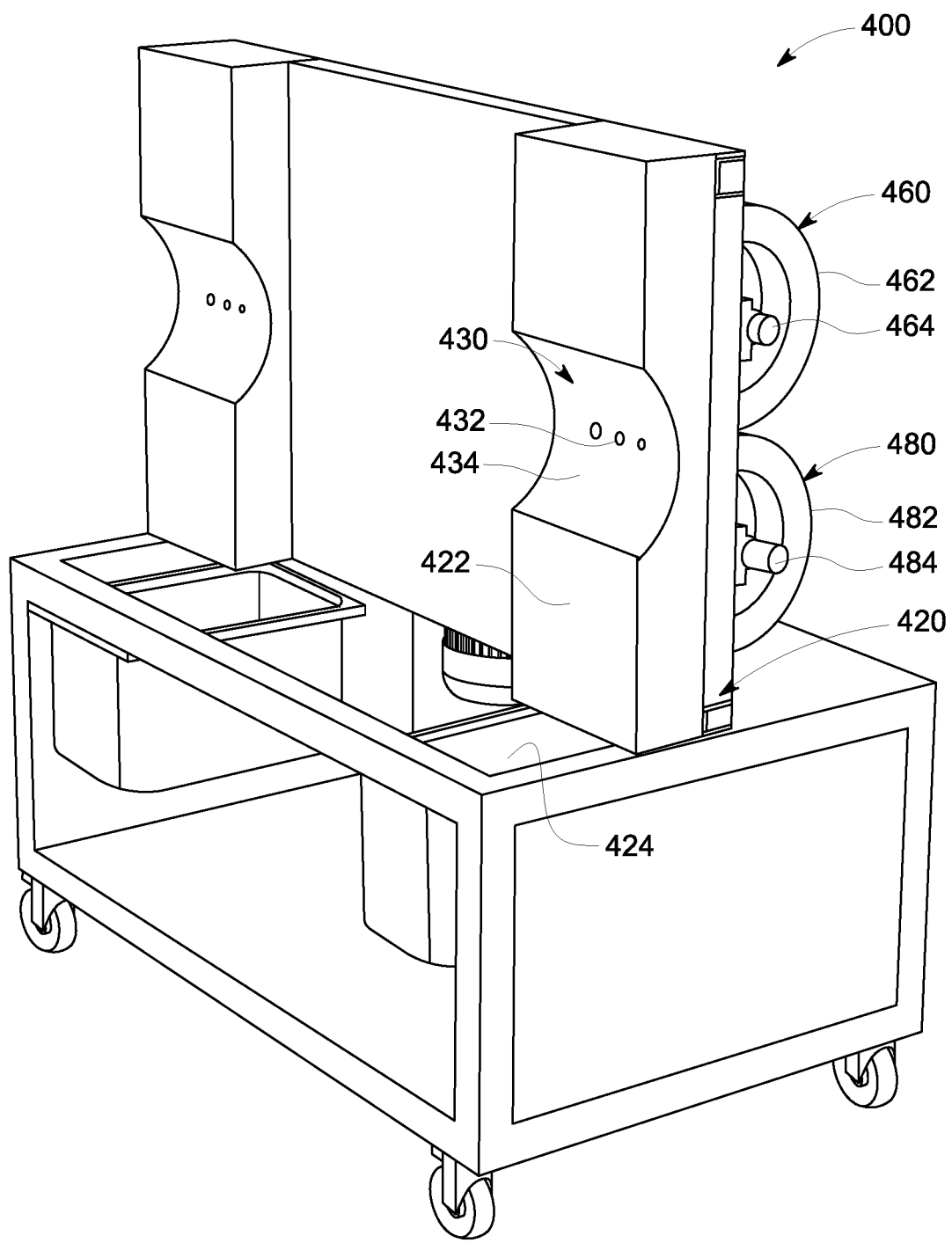
FIG. 12A is a perspective view of a cannabis stem harvesting system in accordance with embodiments of the present invention.
Figure 12B:
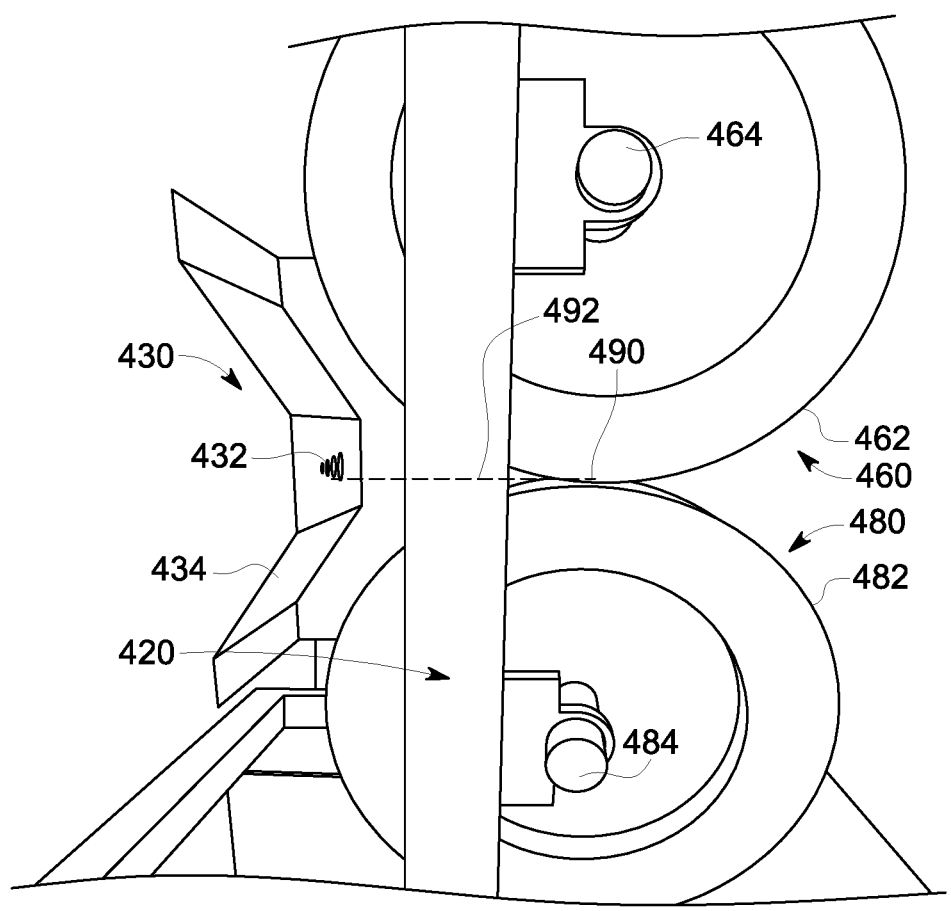
FIG. 12B is a cross sectional view of the system illustrated in FIG. 12A showing the pinch region and distance to the pinch region from the orifices.

Reference is next made to FIG. 12A-B which illustrate views of a cannabis stem harvesting system, designated generally at 400. The system includes a frame member 420, die member 430, first rotating cylindrical member 460, a second rotating cylindrical member 480, rotation system, and a pinch region 490. The illustrated frame member 420 includes a rigid structural support frames and structures. The frame member 420 may comprise a metal material including but not limited to aluminum or steel. The illustrated frame member 420 includes four castor wheels to enable translation of the system 400. The frame member 420 further includes various shielding panels to isolate and protect a user from the first and second cylindrical rotating members 460, 480. The shielding panels in the illustrated embodiment include a top and bottom cowling 422. The frame member 420 may further include one or more receptacles for receiving plant material. In the illustrated embodiment, two harvest bins 424 are disposed below the die member 430 on the user side which is opposite the first and second cylindrical rotating members 460, 480. The harvest bins 424 are configured to receive the plant leaves and buds as shown in FIG. 11. Although not shown, it will be appreciated that a second set of stem bins or receptacles may be included to catch the separated stems as shown in FIG. 11. Various other equipment may be incorporated into the process including but not limited to conveyors for transporting buds and leaves. The frame member 420 is coupled to both the die member 430 and the first and second cylindrical rotating members 460, 480 so as to orient them as shown. In particular, the first and second cylindrical rotating members 460, 480 are oriented in a substantially vertical or stacked configuration in which the first cylindrical rotating member 460 is positioned above the second cylindrical rotating member 480. The orientation or configuration further includes orienting the first and second cylindrical rotating members in a substantially parallel horizontal and depth alignment. The terms substantially vertical, horizontal, and depth are used in accordance with the visual representations shown in FIGS. 12A-B.

The die member 430 is a single layer panel including a plate 432 and a plurality of orifices 434 disposed on the plate. The plate 432 shown in the illustrated embodiment is vertically concave with respect to the user. The purpose of the concave surface is to position the plurality of orifices 434 close (in proximity) to the first and second cylindrical rotating members 460, 480 while maintaining the shielding and isolation of the user necessary for safety. Alternative system embodiments discussed below will illustrate other techniques for disposing the orifices 434 in close proximity to the first and second cylindrical rotating members 460, 480 without a concave plate 432. The plurality of orifices 434 include at least two holes having different diameters. The plurality of orifices 434 are oriented on the plate 432 horizontally in a manner such that each of the orifices are substantially equidistant to the first and second cylindrical rotating members 460, 480. The orifices 434 may each include shapes that are circular or non-circular to accommodate various stripping properties. The orifices 434 inherently form an edge at the junction with the plate 432. The thickness and composition of the plate 432 will affect the stripping characteristics of the orifices 434. The edge may be orthogonal, ramped, or curved so as to further affect the stripping characteristics of the system. Extensive testing with respect to cannabis has resulted in maximum and minimum sizing of the orifices 434 between one quarter inch and two inches.

The first and second cylindrical rotating members 460, 480 are cylindrically shaped members including a first and second circumferential surface 462, 482 and a first and second axle 464, 484 respectively. The first and second circumferential surfaces 462, 482 are curved radial surfaces which encircle the first and second cylindrical rotating members 460, 480 and are between two ends as shown. The length of the first and second circumferential surfaces 462, 482 is based on the diameter of cylindrical rotating member and/or the ends. Extensive testing with respect to cannabis has resulted in a maximum and minimum diameter sizing of the cylindrical members 460, 480 between three and twelve inches. It will be appreciated that the first and second circumferential surfaces 462, 482 may include a raised gripping pattern (not shown) such as a tread (i.e. tire), plurality of ribs (i.e. gear), and/or any other pattern of raised regions. In addition, the first and second cylindrical rotating members 460, 480 may include various material compositions of a particular durometer, which may result in a deformation in the first and second circumferential surfaces 462, 482 across particular regions under certain circumstances. The durometer of the members may be based on an internal air pressure (i.e. tire), material composition (i.e. rubber, steel, plastic), and/or other variables. The first and second cylindrical rotating members 460, 480 are configured to rotate about the first and second axles 464, 484. The rotation includes translating the first and second circumferential surfaces 462, 482 in a radial manner such that a single point on a circumferential surface may translate in a substantially circular orbit around the respective axle. The rotation may further include an opposite rotation of each of the circumferential surfaces including the first circumferential surface 462 rotating in a counter-clockwise orbit and the second circumferential surface rotating in a clockwise orbit with respect to the perspective shown in FIGS. 12A-B. This opposite rotation causes a pulling force to be exerted on an object positioned between the first and second circumferential surface. The pulling force is directed away from the die member 430.

At least one of the first and second cylindrical rotating members 460, 480 is further coupled to a rotation system configured to enable automatic rotation of the cylindrical rotating members 460, 480 in the manner described above. The rotation system may be directly coupled to one or both of the cylindrical rotating members 460, 490. The rotation system is not illustrated in the embodiment shown in FIGS. 12A-B but will be illustrated in more detail with reference to the figures below. The rotation system may be configured to rotate the first and second cylindrical rotating members 460, 480 at a variable selective speed/rate to accommodate different harvesting characteristics, plant strains, and/or other unique plant characteristics. Extensive testing of medical cannabis has concluded that the variable selective rotation speed of the first and second cylindrical rotating members 460, 480 must produce a feed rate between 10 and 250 feet per minute. A slower feed rate is desirable for dry stripping processes so as to minimize damage to the leaves and buds. Likewise, a faster feed rate is desirable for wet stripping so as to optimize processing. This feed rate corresponds to approximately 188 revolutions per minute for a cylindrical member having a six inch diameter. The rotation system may further include a motor, power source, and user selection mechanism.

The pinch region 490 is a region of closest proximity between the first and second circumferential surfaces 462, 482 of the first and second cylindrical rotating members 460, 480. The alignment of the cylindrical rotating members 460, 480 discussed above causes the pinch region to be a region between the circumferential surfaces 462, 482 that is vertically aligned with the axles 464, 484 as shown in FIG. 12B. The pinch region 490 extends across the circumferential surfaces 462, 482 at a particular radial location. It will therefore be appreciated that the illustrated horizontal alignment of the orifices 434 discussed above further achieves a consistent alignment and spacing with the pinch region 490 in the illustrated embodiment. The pinch region 490 may include a coupling between the first and second circumferential surfaces 462, 482 or a proximity under two inches. Variables pertaining to the pinch region 490 are critical for the safe and efficient operation of the system 400. The distance to the pinch region 492 from the orifices 434 is also a critical measurement in the operation of the overall system 400. Extensive testing has concluded that the distance to the pinch region 492 must be under six inches to function properly for harvesting of cannabis with an optimal value of approximately two inches. This discovery is in contrast to the operation of conventional stripping systems which were adapted for stalk type plants such as a tobacco. For at least this reason, conventional systems cannot be adapted to function for cannabis without significant inefficiencies or diminished user safety.

Figure 13:
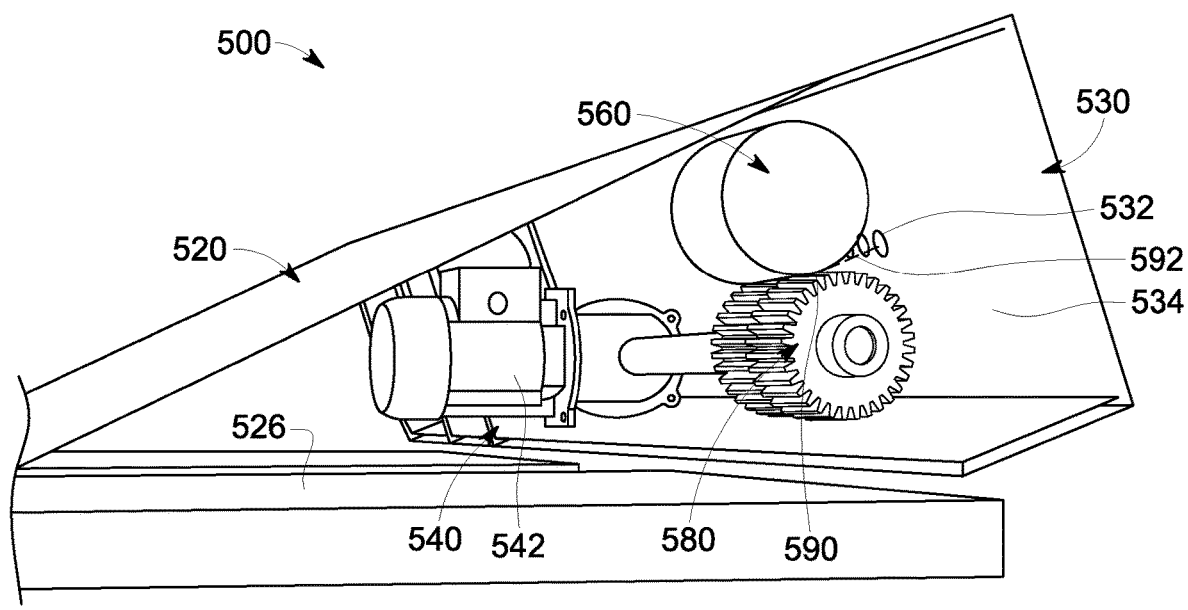
FIG. 13 is a perspective view of an alternative cannabis stem harvesting system in accordance with embodiments of the present invention.

Reference is next made to FIG. 13 which illustrates a view of an alternative cannabis stem harvesting system, designated generally at 500. The system 500 includes a frame member 520, a die member 530, first rotating cylindrical member 560, second rotating cylindrical member 580, pinch region 590, and rotation system 540. The alternative embodiment system 500 shown in FIG. 13 illustrates various alternative configurations with respect to the system 400 shown in FIGS. 12A-B while still implementing the same overall novel concepts. The components of the alternative system function in the same manner but incorporate alternative implementations or size parameters. First, the frame member 520 configuration eliminates the cowling and various shielding plates. The frame member 520 includes a top shielding plate rather than the vertical plates shown in the previous embodiment. Second, the die member 530 and configuration of the first and second cylindrical rotating members 560, 580 include an offset or tilt. In particular, the plate 532 of the die member 530 is tilted away from a user, thereby offering a better field of view to the user. In addition, the plate 532 tilting allows the stems to translate through the system into conveyors or binds without encountering operational components. Likewise, the positioning of the first cylindrical rotating member 560 is offset/tilted back from the second cylindrical rotating member 580 by a corresponding angle. The first and second cylindrical rotating members 560, 580 are still substantially vertically aligned but simply include an offset. The die member 530 also includes a plurality of orifices 534 oriented equidistant to the cylindrical rotating members 460, 480. The angle of the plate 532 and cylindrical rotating members 560, 580 also orients the plurality of orifices 534 at an angle which may allow a user to efficiently orient, align, and insert cannabis plants into the optimal orifice. The orifices 534 will also maintain a consistent distance from the pinch region 590 as a result of the offset of the first cylindrical rotating member. Third, the illustrated system 500 shows a particular configuration of the rotation system 540 with respect to the first and second cylindrical rotating members 560, 580. The rotation system 540 includes a motor 542 which is coupled only to the second cylindrical rotating member 580. The second cylindrical rotating member 580 thereby functions as a driver, while the first cylindrical rotating member 560 functions as a follower. In addition, the second cylindrical rotating member 582 includes a gear type circumferential surface and composition. The gear type composition may include a metal or nylon gear having a plurality of radial ribs/teeth across the circumferential surface as shown. The first circumferential surface may be coupled to the second circumferential surface at the pinch region 590 to enable the counter-clockwise rotation of the second cylindrical rotation member 580 to automatically drive the clockwise rotation of the first cylindrical rotating member. Fourth, the system 500 illustrates a stem bin 526 disposed below the cylindrical rotating members 560, 580 to collect stems from inserted cannabis plants as shown in FIG. 11.

Figure 14A:
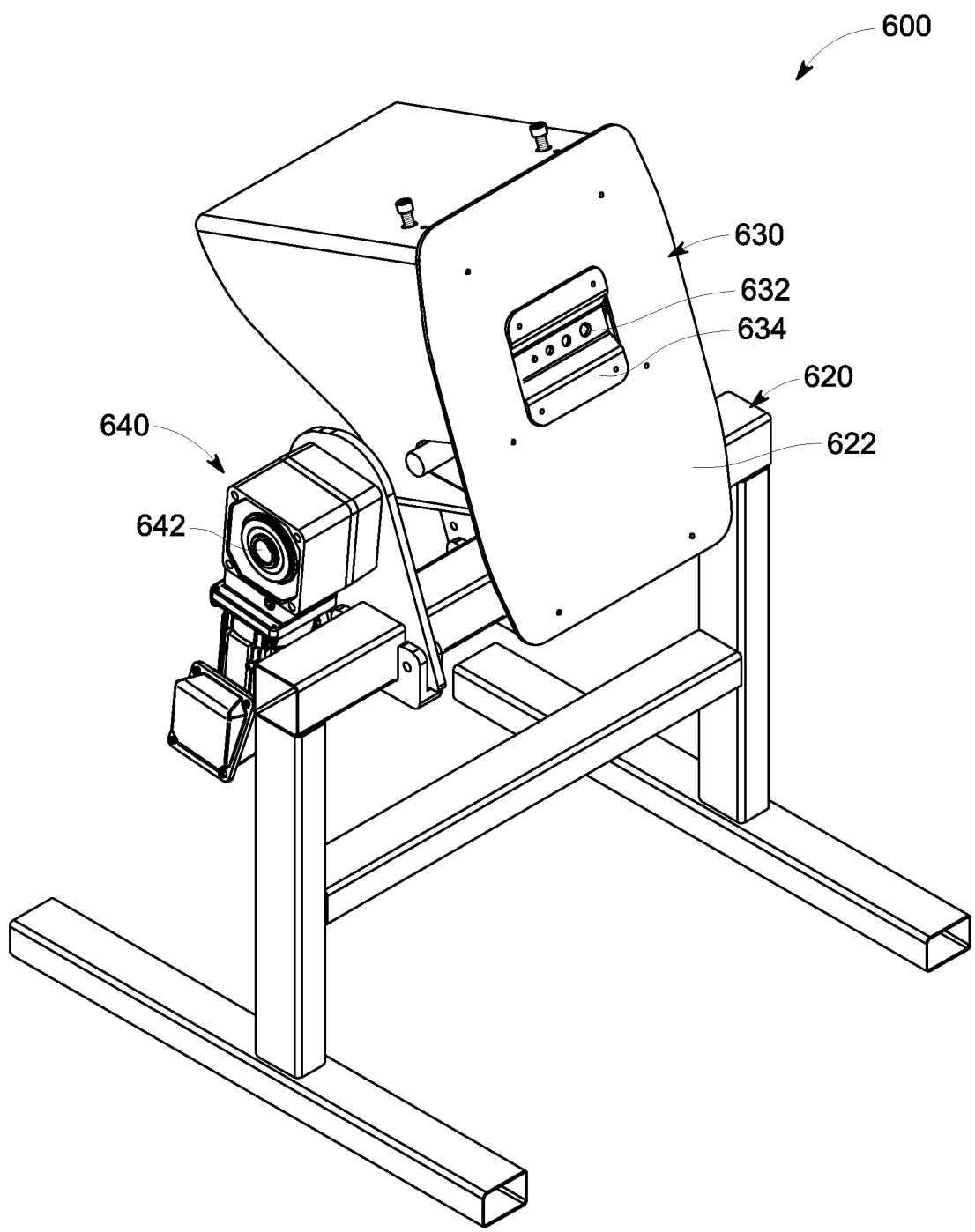
FIG. 14A is a perspective view of a cannabis stem harvesting system in accordance with embodiments of the present invention.
Figure 14B:
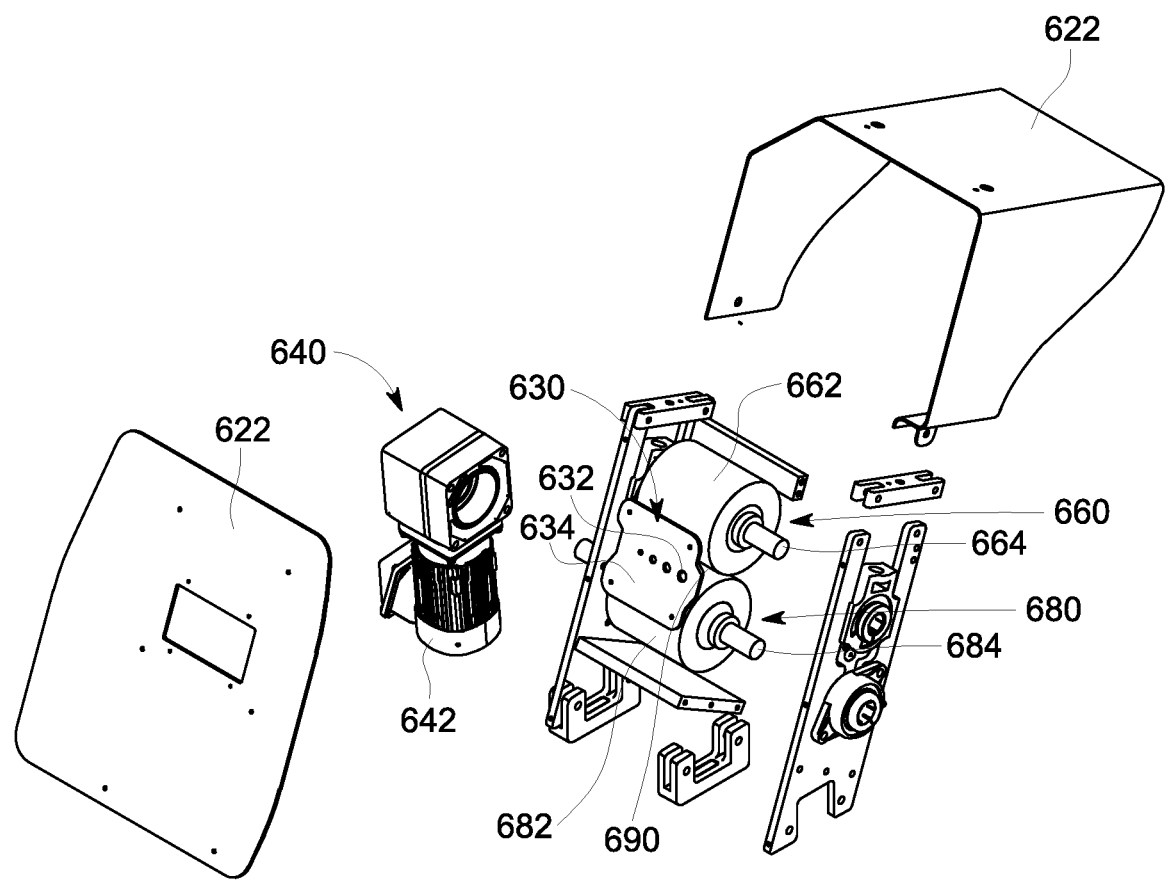
FIG. 14B is an exploded view of the system illustrated in FIG. 14A showing the rotation system, cylindrical rotation members, and pinch region.

Reference is next made to FIG. 14A-B which illustrate views of another alternative cannabis stem harvesting system, designated generally at 600. The system 600 includes a frame member 620, a die member 630, first cylindrical rotating member 660, second cylindrical rotating member 680, and rotation system 640. The alternative embodiment system 600 shown in FIGS. 14A-B illustrate various alternative configurations with respect to the system 400 shown in FIGS. 12A-B while still implementing the same overall novel concepts. The components of the alternative system function in the same manner but incorporate alternative implementations or size parameters. The system 600 also includes an angulation of the die member 630 and cylindrical rotating members 660, 680 away from the user as described above with reference to the system 500. The frame member 620 further includes a top and front cowling 622 around the die member 630 and cylindrical rotating members 660, 680 to protect the user. The plate 632 of the die member 630 includes a concave surface similar to the system 400 shown in FIGS. 12A-B. The concave surface of the plate 632 optimally positions the plurality of orifices 634 closer to the pinch region 690, thereby reducing the distance to the pinch region (not shown). The concavity of the plate 632 thereby maintains the optimal orifice 634 distance to the pinch region 690 of a smaller diameter cylindrical rotating member while allowing for a larger diameter cylindrical rotating member. Larger diameter cylindrical rotating members are preferred for optimizing gripping force at the pinch region 690. The frame member 620 includes a simplified set of support structures coupled to support the components of the system 600 in the manner shown. The rotation system 640 is coupled to the frame member 620 so as to position a motor 642 adjacent to cylindrical rotating members 660, 680 and respective axles 664, 684. The motor 642 is coupled indirectly to the second axle 684 via gearing members to facilitate corresponding motor driven rotation of the second axle 684. The first and second circumferential surfaces 662, 682 are coupled at the pinch region 690 to facilitate the driver-follower operation of the cylindrical rotating members 660, 680 described above with reference to the system 500. An adjustable pressure system (not shown) between the first and second cylindrical rotating members 660, 680 includes a bolt and adjustment slot on the frame member 620. The adjustment slot may include a plurality of indexing marks representing certain pressure levels. Various support structures are shown in the exploded view of FIG. 14B to illustrate the optimal orientation of the components.

Figure 15:
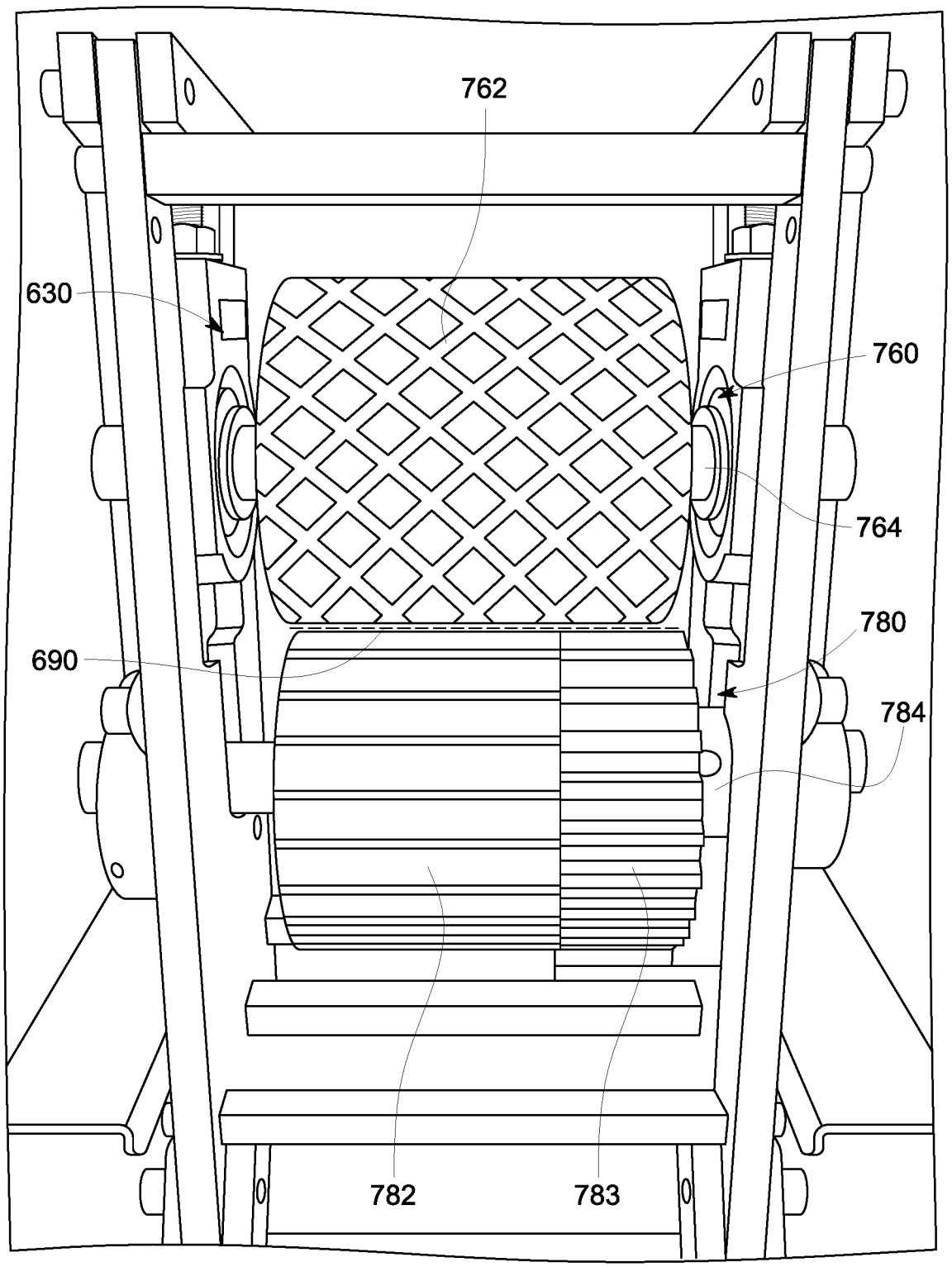
FIG. 15 is a perspective view of an alternative rotation, cylindrical rotation members, and pinch region.
Figure 16A:
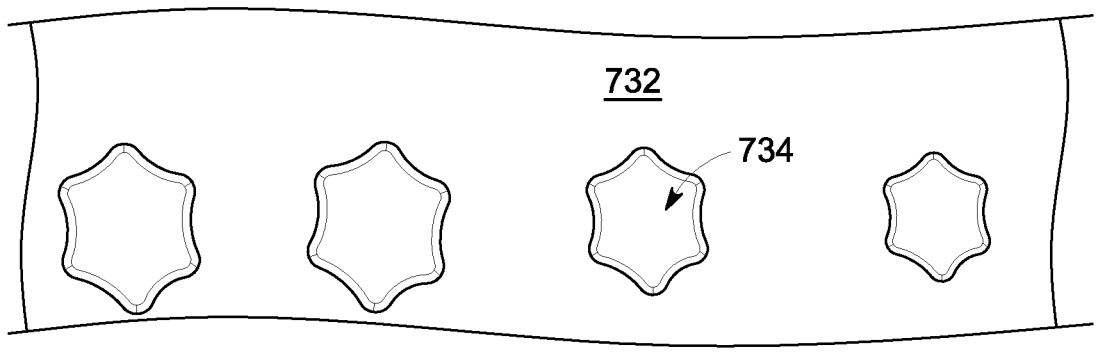
FIG. 16A is a perspective view of an alternative embodiment of the orifices.
Figure 16B:
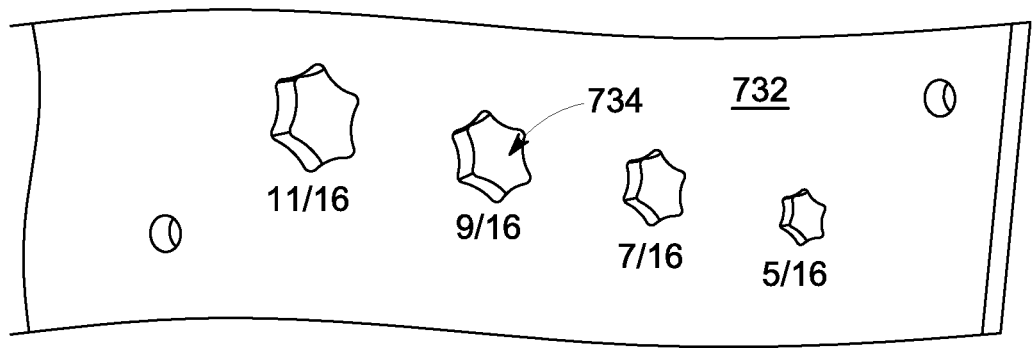
FIG. 16B is a schematic view of the embodiment shown in FIG. 16A.

Reference is next made to FIG. 15, which illustrates a perspective view of an alternative embodiment of cylindrical rotation members designated generally at 760, 780. The alternative cylindrical rotation members 760, 780 shown in FIGS. 16A-B illustrate various alternative configurations with respect to the system 400 shown in FIGS. 14A-B while still implementing the same overall novel concepts. The components of the alternative system function in the same manner but incorporate alternative implementations or size parameters. The first and second circumferential surfaces 762, 782, 783 are coupled at the pinch region 690 (designated as a dashed line) to facilitate the driver-follower operation of the cylindrical rotating members 660, 680 described above with reference to the system 500. The first and second cylindrical rotating members 660, 680 have a cross sectional diameter of six inches. The first circumferential region 762 comprises a rubber material with a durometer of 45 Shore A and a diamond pattern composed of ⅛ inch grooves. The embodiment shown in FIG. 15 is unique in that the second circumferential surface includes a first region 782 and a second region 783. The first region 782 of the second circumferential surface comprises a rubber material with a durometer of 45 Shore A and a horizontal pattern composed of ⅛ inch grooves. The second region 783 of the second circumferential surface comprises a harder non-rubber (i.e. steel, plastic, nylon, etc.) material having large flanges acting as a gear. The second region 783 of the second circumferential surface is specifically oriented with the plate (not shown) to align with at least one of the largest diameter orifices 734. Extensive testing has concluded that the particular circumferential surface configuration optimizes the feeding of cannabis stems. In particular, the rubber to rubber configuration is optimal for smaller diameter stems because the specific forces at the pinch region are balanced between pulling and repelling excess material. Likewise, the rubber to gear configuration is optimal for larger diameter stems because the forces at the pinch region are balanced. Various support structures are shown in the exploded view of FIG. 14B to illustrate the optimal orientation of the components.

Reference is next made to FIGS. 16A and B, which illustrate alternative embodiments of a plate 732 with the plurality of orifices 734. Extensive testing has concluded that the optimal three dimensional shape for the orifices includes a star-like shape with rounded (non-sharp) internal edge.

It should be noted that various alternative system designs may be practiced in accordance with the present invention, including one or more portions or concepts of the embodiment illustrated in FIG. 1 or described above. Various other embodiments have been contemplated, including combinations in whole or in part of the embodiments described above.

What is claimed is:

1. A system for cannabis stem harvesting configured to specifically separate the leaves and buds from the stem comprising:
   a frame member;
   a die member coupled to the frame member, wherein the die member includes a plurality of orifices disposed within a plate;

a first rotating cylindrical member coupled to the frame member substantially adjacent to the die member including a first circumferential surface disposed between two ends;
a second rotating member coupled to the frame member substantially adjacent to the die member including a second circumferential surface disposed between two ends;
wherein the two rotating members are oriented and supported by the frame member in a substantially vertical configuration defining a pinch region therebetween as a region across which the first and second circumferential surfaces are in the closest proximity to one another;
a rotation system including a motor and power source coupled to the frame member and at least one of the first and second rotating members; and
wherein the coupling between the die member and the frame member includes disposing the plurality of orifices within six inches of the pinch region.

2. The system of claim 1, wherein the coupling between the die member and the frame member includes disposing the plurality of orifices within four inches of the pinch region.

3. The system of claim 1, wherein the coupling between the die member and the frame member includes orienting the plate at an angle.

4. The system of claim 1, wherein the first and second cylindrical members are configured to rotate about a first and second axle, and wherein the ends of the first and second cylindrical members include an end diameter between three and twelve inches.

5. The system of claim 4, wherein at least one of the first and second axles is coupled to the motor of the rotation system.

6. The system of claim 1, wherein the plurality of orifices include both circular and non-circular openings under two inches in diameter.

7. The system of claim 1, wherein the rotation system is variable and configured to rotate at least one of the first and second rotating members at a selectable rotation speed between ten and two hundred and fifty linear feet per minute, wherein the unit of linear feet per minute corresponds to at least one of the first and second circumferential surface with respect to the plurality of orifices.

8. The system of claim 7, wherein the rotation system includes a user adjustment member disposed on the plate and configured to selectively control the selectable rotation speed.

9. The system of claim 1, wherein the rotation system is configured to rotate only one of the first and second rotating members as a drive rotator, and wherein the first and second rotating members are coupled at the pinch region thereby causing an automatic dependent rotation of the non-drive rotator as a follow rotator.

10. The system of claim 9, wherein the coupling between the first and second circumferential regions includes an accommodating pressure system including at least one of a durometer of the first and second rotating member, a first and second gripping surface on the first and second circumferential surfaces respectively, and a tension member coupling between the first and second rotating member and the frame member.

11. A system for cannabis stem harvesting configured to specifically separate the leaves and buds from the stem comprising:
a frame member;
a die member coupled to the frame member, wherein the die member includes a plurality of orifices disposed within a plate;
a first rotating cylindrical member coupled to the frame member substantially adjacent to the die member including a first circumferential surface disposed between two ends;
a second rotating member coupled to the frame member substantially adjacent to the die member including a second circumferential surface disposed between two ends;
wherein the two rotating members are oriented and supported by the frame member in a substantially vertical configuration defining a pinch region therebetween as a region across which the first and second circumferential surfaces are in the closest proximity to one another, wherein the coupling between the die member and the frame member includes orienting the plurality of orifices with respect to the pinch region; and
a variable rotation system including a motor and power source coupled to the frame member and at least one of the first and second rotating members, wherein the rotation system is configured to rotate at least one of the first and second rotating members at a selectable rotation speed between ten and two hundred and fifty linear feet per minute, wherein the unit of linear feet per minute corresponds to at least one of the first and second circumferential surface with respect to the plurality of orifices.

12. The system of claim 11, wherein the variable rotation system includes a user adjustment member disposed on the plate and configured to selectively control the selectable rotation speed.

13. The system of claim 11, wherein the coupling between the die member and the frame member includes orienting the plate at an angle.

14. The system of claim 11, wherein the first and second cylindrical members are configured to rotate about a first and second axle, and wherein the ends of the first and second cylindrical members include an end diameter between three and twelve inches.

15. The system of claim 14, wherein at least one of the first and second axles is coupled to the motor of the rotation system.

16. The system of claim 11, wherein the plurality of orifices include both circular and non-circular openings under two inches in diameter.

17. The system of claim 11, wherein the rotation system is configured to rotate only one of the first and second rotating members as a drive rotator, and wherein the first and second rotating members are coupled at the pinch region thereby causing an automatic dependent rotation of the non-drive rotator as a follow rotator.

18. The system of claim 17, wherein the coupling between the first and second circumferential regions includes an accommodating pressure system including at least one of a durometer of the first and second rotating member, a first and second gripping surface on the first and second circumferential surfaces respectively, and a tension member coupling between the first and second rotating member and the frame member.

19. A system for cannabis stem harvesting configured to specifically separate the leaves and buds from the stem comprising:
a frame member;
a die member coupled to the frame member, wherein the die member includes a plurality of orifices disposed within a plate, wherein the plurality of orifices include both circular and non-circular openings under two inches in diameter;

a first rotating cylindrical member coupled to the frame member substantially adjacent to the die member including a first circumferential surface disposed between two ends;

a second rotating member coupled to the frame member substantially adjacent to the die member including a second circumferential surface disposed between two ends;

wherein the two rotating members are oriented and supported by the frame member in a substantially vertical configuration defining a pinch region therebetween as a region across which the first and second circumferential surfaces are in the closest proximity to one another, wherein the coupling between the die member and the frame member includes disposing the plurality of orifices within six inches of the pinch region, wherein the first and second cylindrical members include a cross sectional diameter between three and twelve inches; and a variable rotation system including a motor and power source coupled to the frame member and at least one of the first and second rotating members, wherein the rotation system is configured to rotate at least one of the first and second rotating members at a selectable rotation speed between ten and two hundred and fifty linear feet per minute, wherein the unit of linear feet per minute corresponds to at least one of the first and second circumferential surface with respect to the plurality of orifices; and wherein the rotation system is configured to rotate only one of the first and second rotating members as a drive rotating member, and wherein the first and second rotating members are coupled at the pinch region thereby causing an automatic dependent rotation of the non-drive rotating member as a follow rotating member.

* * * * *

(12) EX PARTE REEXAMINATION CERTIFICATE (12826th)
United States Patent
Desmarais et al.

(10) Number: US 11,766,066 C1
(45) Certificate Issued: Jan. 27, 2025

(54) SYSTEMS AND METHODS FOR MEDICINAL CANNABIS HARVESTING

(71) Applicants: Kerry T Desmarais, Sunnyside, WA (US); Thomas Carpenter, Jr., Granger, WA (US); Craig A Carpenter, Granger, WA (US); Matthew Ryan Beechinor, Ketchum, ID (US); Thomas Frazer, Ketchum, ID (US); Bill Belcourt, Salt Lake City, UT (US); Evan Bouchier, Issaquah, WA (US)

(72) Inventors: Kerry T Desmarais, Sunnyside, WA (US); Thomas Carpenter, Jr., Granger, WA (US); Craig A Carpenter, Granger, WA (US); Matthew Ryan Beechinor, Ketchum, ID (US); Thomas Frazer, Ketchum, ID (US); Bill Belcourt, Salt Lake City, UT (US); Evan Bouchier, Issaquah, WA (US)

(73) Assignee: FRAZER INDUSTRIES LLC, Ketchum, ID (US)

Reexamination Request:
No. 90/019,579, Jul. 16, 2024

Reexamination Certificate for:
Patent No.: 11,766,066
Issued: Sep. 26, 2023
Appl. No.: 15/261,894
Filed: Sep. 10, 2016

Related U.S. Application Data

(63) Continuation-in-part of application No. 13/012,443, filed on Jan. 24, 2011, now Pat. No. 9,961,834, and a continuation-in-part of application No. 12/319,984, filed on Jan. 13, 2009, now abandoned.

(51) Int. Cl.
*A24B 5/06* (2006.01)
*A01D 46/02* (2006.01)

(52) U.S. Cl.
CPC .............. *A24B 5/06* (2013.01); *A01D 46/02* (2013.01)

(58) Field of Classification Search
None
See application file for complete search history.

(56) References Cited

To view the complete listing of prior art documents cited during the proceeding for Reexamination Control Number 90/019,579, please refer to the USPTO's Patent Electronic System.

*Primary Examiner* — William C Doerrler

(57) ABSTRACT

One embodiment of the present invention relates to a system for cannabis stem harvesting configured to specifically separate the leaves and buds from the stem. The system includes a frame member, die member, first rotating cylindrical member, second rotating cylindrical member, and a rotation system. The die member is coupled to the frame member and includes a plurality of orifices disposed within a plate. The first and second rotating cylindrical members are coupled to the frame member in a vertical configuration and oriented substantially adjacent to the die member. The vertical configuration of the first and second rotating cylindrical members defines a pinch region therebetween as a region across which a first and second circumferential surface of the first and second rotating cylindrical members are closest in proximity. The rotation system is coupled to the frame member and at least one of the first and second rotating members.

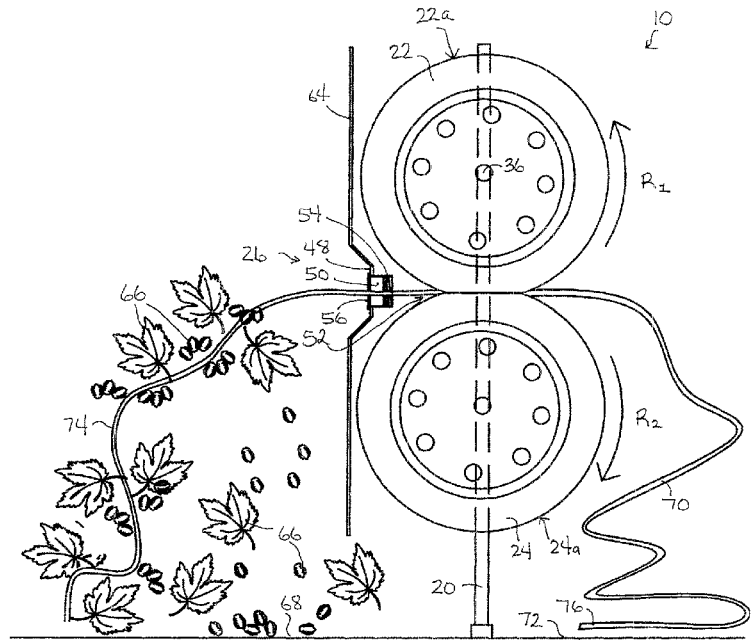

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 7 and 9 are determined to be patentable as amended.

Claims 8 and 10, dependent on an amended claim, are determined to be patentable.

Claims 1-6 and 11-19 were not reexamined.

7. The system of claim 1, wherein the rotation system is variable and configured to rotate at least one of the first and second rotating members at a selectable rotation speed between ten and two hundred and fifty linear feet per minute, wherein the unit of linear feet per minute corresponds to at least one of the first and second circumferential surface with respect to the plurality of orifices, *and wherein the coupling between the die member and the frame member includes disposing the plurality of orifices within four inches of the pinch region*.

9. The system of claim 1, wherein the rotation system is configured to rotate only one of the first and second rotating members as a drive rotator, and wherein the first and second rotating members are coupled at the pinch region thereby causing an automatic dependent rotation of the non-drive rotator as a follow rotator, *and wherein the coupling between the die member and the frame member includes disposing the plurality of orifices within four inches of the pinch region*.

* * * * *